May 16, 1967 J. W. HART 3,320,597

MAGNETIC DATA STORE WITH NONDESTRUCTIVE READ-OUT

Filed April 15, 1963 3 Sheets-Sheet 1

INVENTOR.
JOSEPH W. HART

BY Francis A. Varallo
AGENT

MAGNETIC DATA STORE WITH NONDESTRUCTIVE READ-OUT

Filed April 15, 1963 3 Sheets-Sheet 2

INVENTOR.
JOSEPH W. HART
BY
Francis A. Varallo
AGENT

May 16, 1967 J. W. HART 3,320,597

MAGNETIC DATA STORE WITH NONDESTRUCTIVE READ-OUT

Filed April 15, 1963 3 Sheets-Sheet 3

United States Patent Office 3,320,597

Patented May 16, 1967

3,320,597

MAGNETIC DATA STORE WITH NONDESTRUCTIVE READ-OUT

Joseph W. Hart, Audubon, Pa., assignor to Burroughs Corporation, Detroit, Mich., a corporation of Michigan Filed Apr. 15, 1963, Ser. No. 273,045
14 Claims. (Cl. 340—174)

The present invention relates generally to thin films or layers of ferromagnetic material, and more specifically to the utilization of such material in providing improved nondestructive memory elements and arrays.

Thin ferromagnetic films have become increasingly prominent as computer storage elements. These films may be arranged to form data stores or memories of useful capacity and high reliability. As such, they offer a practical and economical solution to the continual problem of achieving higher speed memories.

Thin fiims of magnetic material may be produced which have a uniaxial anisotropy, or preferred (easy) axis or direction of magnetization in which substantially all of the magnetic domains lie parallel to this axis. After a relation has been arbitrarily established between the value of the bit of information to be stored and the sense of magnetization, the ferromagnetic material may be stably magnetized in either one of two possible states along the easy axis. Methods of using thin films to store data are described and claimed in copending application for U.S. Patent, Ser. No. 728,212, entitled, "Magnetic Data Store," filed in the name of Eric E. Bittmann, and assigned to the same assignee as the present application. To determine in which sense or state the material has been left magnetized, it is conventional to apply to the magnetic material a reading or read-out magnetizing field, in a reference sense. Conventional methods of reading out the information stored in the magnetic element leave the magnetic material in the reference state regardless of the state of the element prior to the reading operation, thereby destroying the information previously stored therein.

The present invention contemplates the use of thin magnetic films with their inherent advantages of reliability, compactness and high operational speed in a nondestructive read-out mode with its concomitant convenience and economy.

Thin magnetic films of the character described have been produced by evaporating a nickel-iron alloy, as for example 81% Ni, and 19% Fe, from a hot tungsten filament onto a heated thin glass substrate. By means of depositing through a mask the Ni-Fe vapor is caused to appear on the substrate in the form of spots, which are generally, although not necessarily, rectangular or circular in form. Another means of forming the spots is by a photo-etch process applied to a deposited continuous sheet of magnetic film. In order to minimize gas contamination of the deposit, the process is carried on in a vacuum, in the $10^{-5}$ torr region. During evaporation, the alloy is deposited at the rate of 10 to 15 Angstroms per second to a nominal thickness of 1200 Angstroms. A strong magnetic field in the order of 10 to 50 oersteds is applied uniformly in a direction parallel to the plane of the substrate during the evaporation process to cause the magnetic domains of the alloy to align in a preferred direction. The latter direction is parallel to the average axis of anisotropy. Other processes may also be employed for fabricating thin magnetic films. These processes include sputtering, vapor deposition (pyrolysis), and electrodeposition.

The magnetic characteristic of thin films in the preferred direction exhibits a substantially rectangular hysteresis loop. In a direction transverse to the easy direction, referred to as the hard direction, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_c$ and $H_k$ are obtained. $H_c$ is the coercive field value (coercivity) evaluated from the rectangular hysteresis loop in the easy direction; $H_k$ is the anisotropy field or saturation magnetization force in the hard direction.

A thin magnetic film possesses small dipole moments which, due to tremendous exchange energy and a single axis of anisotropy, are easily aligned and remain stable along a common axis. Thus, the dipole moments align to form a domain which may be represented by the moment M. M represents the magnitude and direction of the flux within a particular region or volume of the ferromagnetic material. The existing domain theory may be applied to thin films, which theory implies that domains or regions having their respective moments in opposite directions, may exist in a side-by-side arrangement. The boundary between two adjacent domains is called either a "Neel" or "Bloch" wall.

The quiescent position of M occurs where the resultant of torque-imposing forces is zero. This position is generally regarded as the point at which the total energy is a minimum. For the case of a single domain having no external applied field, the quiescent position of M is along the axis of anisotropy, but in either one of the two opposed directions. These directions may be designated respectively the (+) state and the (−) state. Any external field applied to M which has a component directed transverse to M, will produce an unbalanced torque on M. Therefore M will rotate until its direction is such that the unbalanced torque becomes zero. The restoring forces of the film, which are necessarily overcome when M rotates, include the anisotropy energy, magnetostatic energy, magnetostrictive energy and shape anisotropy.

The following energy and torque equations are generally regarded as explaining the behavior of the ideal uniaxial anisotropy film:

(1) Energy equation:

$$E=\frac{H_kM}{2}\sin^2\theta-H_aM(\cos\phi-\theta)$$

(2) Torque equation:

$$L=H_kM\sin\theta\cos\theta-H_aM(\sin\phi-\theta)$$

where, $H_k$=anisotropy field; $M$=magnetic moment; $H_a$=external applied field; $\phi$=the angle between the direction of applied field and the anisotropy axis; $\theta$=the angle between the direction of M and the anisotropy axis.

In a practical application of thin magnetic fielms, the applied field $H_a$ will be the resultant of orthogonal fields $H_L$, the field applied parallel to the easy axis, and $H_T$, the field applied at a right angle to the easy axis. A sensing conductor oriented parallel to the hard direction of the film will sense changes in the component of flux that is directed along the easy direction. This flux component is directly related to M, and since M is a constant depending only on domain geometry, a flux change will occur if M rotates. When a transverse field $H_T$ is applied to a film spot, M will rotate toward the direction of $H_T$. Angles $\theta$ and $\phi$ are the angles that M and $H_a$ respectively make with the axis of anisotropy. The minimum value of $H_T$ for which $\theta$ and $\phi$ become equal is $H_k$, that is, $\theta$=90°. At 90° the flux linking the sensing conductor is zero. A rotation of M from the (−) state to 90° represents an increase in flux. A voltage will be induced that tends to oppose this change. This induced voltage is represented by:

(3) Induced voltage:

$$E=\frac{-d\phi_L}{dt}=M\sin\theta\frac{d\theta}{dt}$$

where: $\phi_L=M\cos\theta$; $d\phi_L=-M\sin\theta d\theta$; $d\phi_L$=flux component in the easy direction.

In accordance with the present invention, the nondestructive mode of operation is accomplished without sacrificing speed or reliability. The basis for this improved operation stems from the discovery that the axis of magnetic anisotropy may be caused to rotate under the influence of an applied transverse magnetizing field. This rotation of the easy axis takes place toward the direction of the applied field and is dependent upon the initial remanent state of the material. The condition resulting from such rotation may be described as "bidirectional anisotropy," wherein the preferred direction of the material varies with the applied field.

It is therefore a general object of the present invention to provide an improved magnetic data store.

Another object of the present invention is to provide a data store which utilizes thin films of ferromagnetic material, and is capable of being interrogated repeatedly in a nondestructive manner.

A more specific object of the present invention is to provide to a magnetic thin film storage element having a preferred axis of magnetization, and means for rotating said axis in a predetermined direction in response to a magnetic field, in order to achieve an improved nondestructive mode of operation.

These and other features of the invention will become more fully apparent from the following description of the annexed drawings, wherein.

Figure 4:
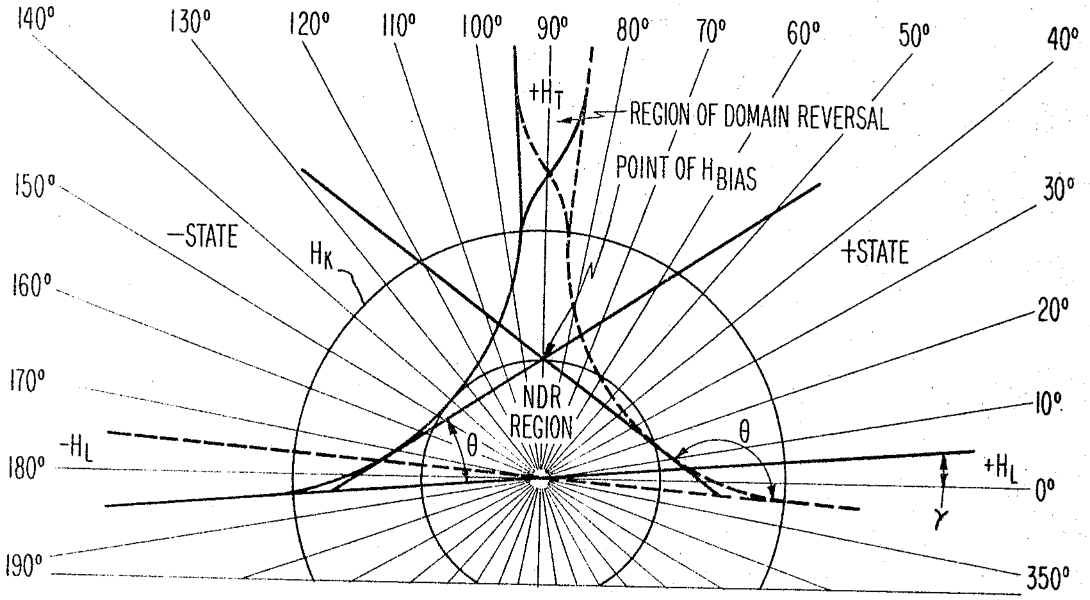
Figure 3A:
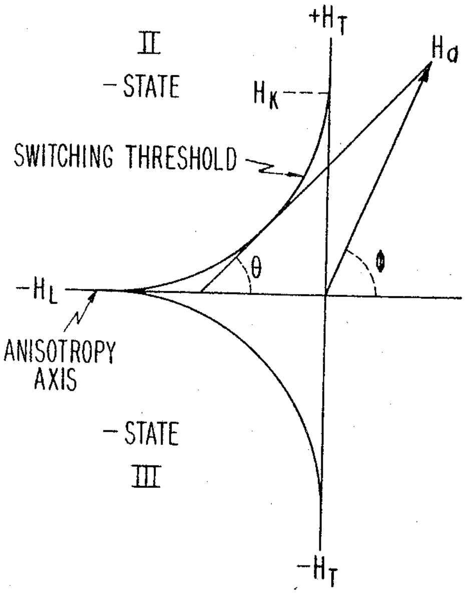
Figure 3B:
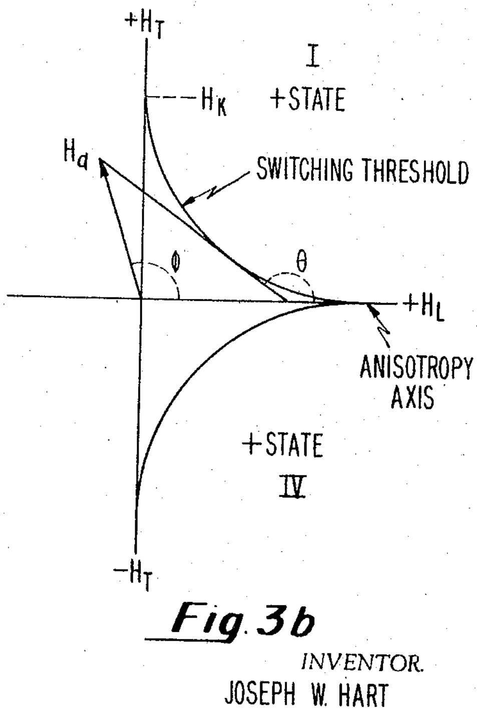
Figure 5:
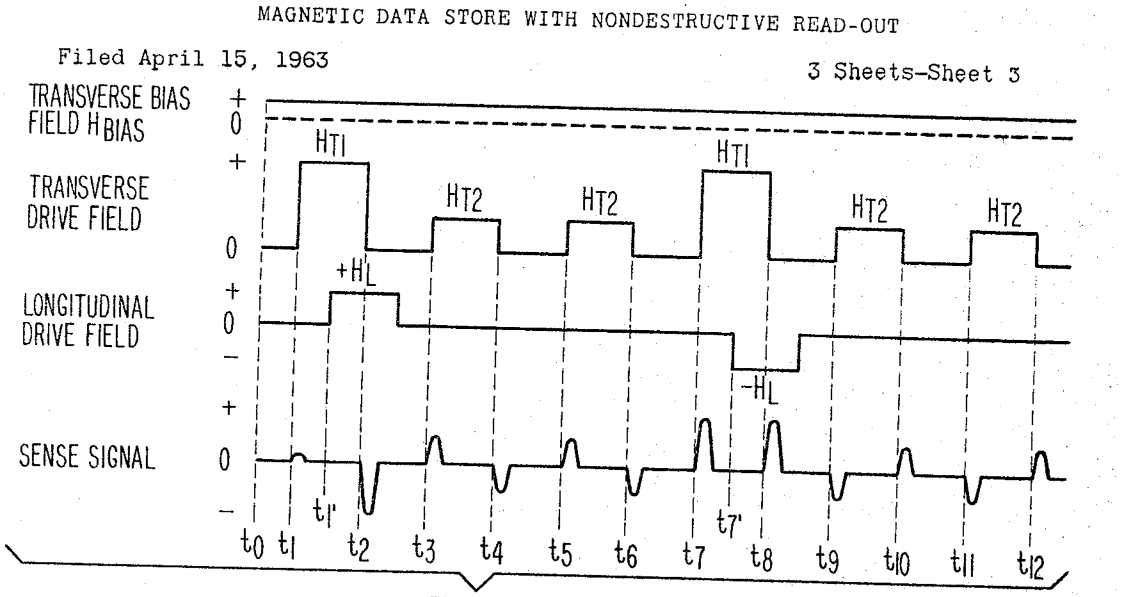
Figure 6:
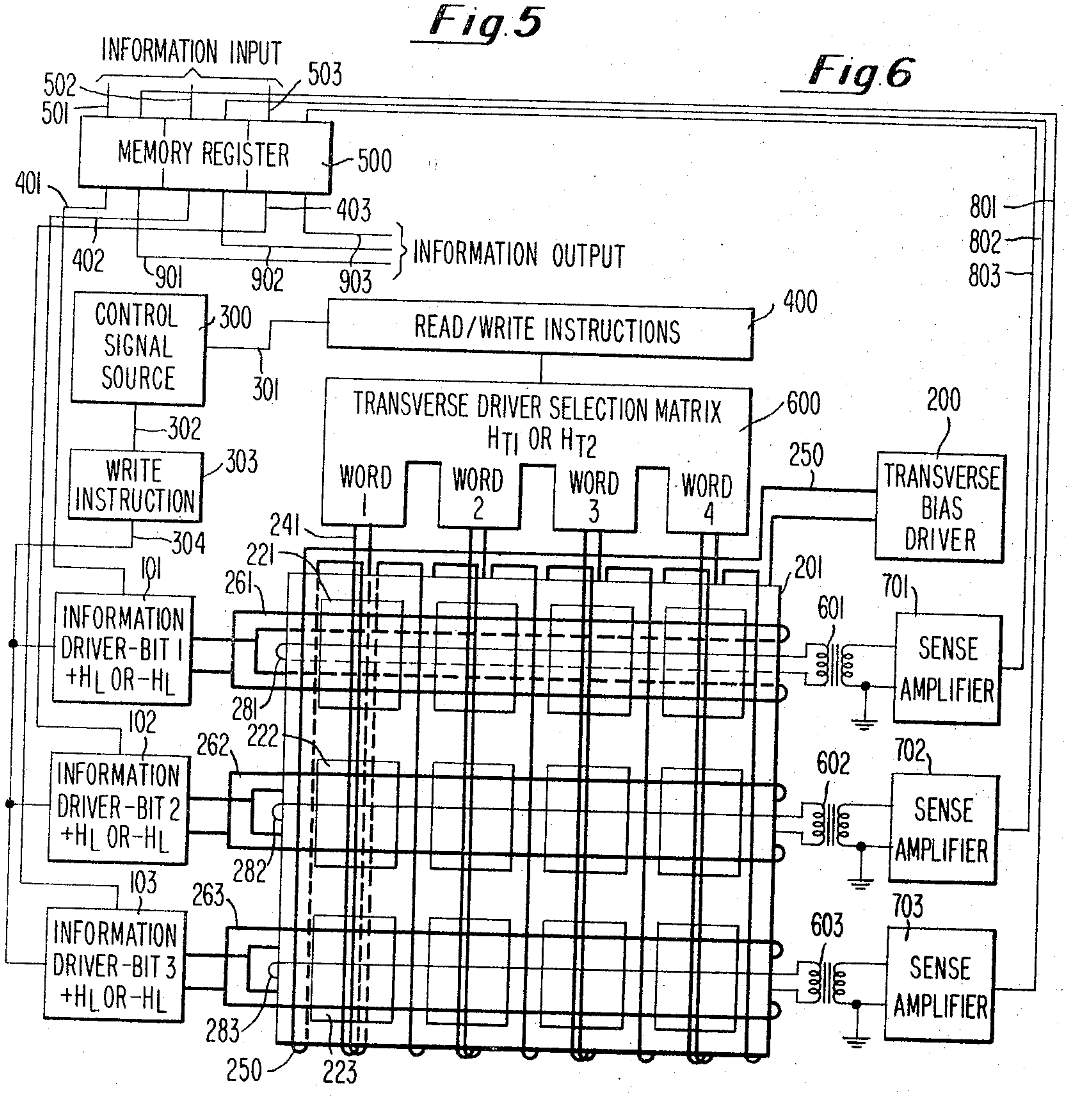

FIGS. 3*a* and 3*b* are threshold switching curves representing respectively the boundaries of the remanent states;

FIG. 4 depicts the rotation of the switching curve due to the action of an applied transverse bias field;

FIG. 5 is a diagram depicting the sequence of fields applied to a thin film element and the corresponding induced voltages generated in the sense conductor for writing in and reading out information arbitrarily representative of a binary "1" and binary "0";

FIG. 6 is a representation of ferromagnetic storage elements with associated conductors and auxiliary equipment arranged for illustrating the utilization of the invention.

Figure 1:
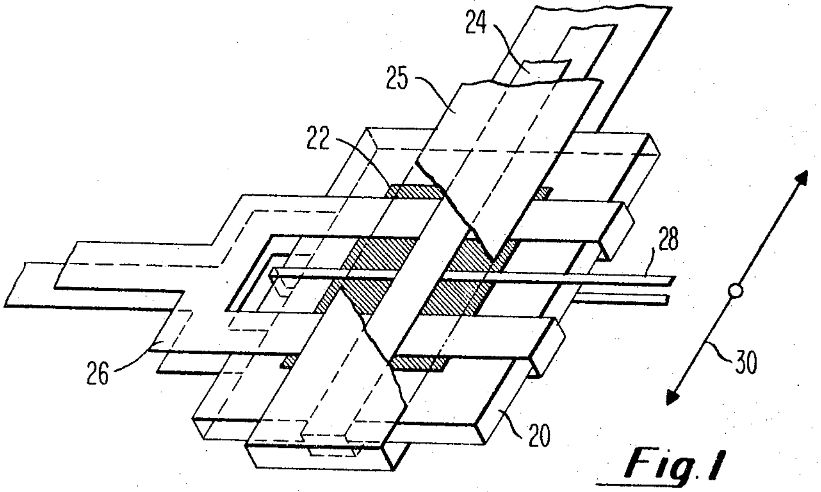
FIG. 1 is a pictorial representation of a ferromagnetic element in relation to a typical arrangement of conductors, as employed in the practice of the invention.

Referring to FIG. 1, there is represented a single unit of a ferromagnetic film element and the associated conductors needed to permit its employment in a data store suitable for use with conventional data handling processing or computing devices. In FIG. 1 the single ferromagnetic film or layer element is depicted as being rectangular in form and is identified by reference numeral 22. In practice the actual geometric form of the element may be other than rectangular, and the invention should not be considered so limited. The conductors or portions of conductors which are intended to affect or be affected by the magnetization of the film element 22 are parallel to the film and in close proximity thereto. The preferred direction of magnetization of the film 22 is indicated by the arrows 30 and lies within the plane of the paper. The conductor 24, oriented parallel to the preferred axis of the film, is employed to generate a transverse drive field, referred to hereinafter as either $H_{T1}$ or $H_{T2}$, depending upon the desired strength of the field. Current flow through conductor 25 generates a transverse bias field, designated $H_{bias}$. The conductor 26, oriented perpendicular to the preferred direction of magnetization is split into two parallel conductors. Each of the latter conductors carries one-half of the current required to generate a parallel or longitudinal field of either polarity, later referred to as either $+H_L$ or $-H_L$. Lying between the split conductors is the sense conductor 28. The purpose of providing split parallel drive conductors is primarily to reduce the capacitive coupling between the latter conductors and the sense conductor, thereby diminishing the generation of spurious signals in the sense conductor. A substrate 20 serves as a support for the other items.

In an actual operative embodiment of this invention, the following parameters were employed successfully. Each ferromagnetic film element was in the form of a rectangle .06 inch by .08 inch, about 1200 angstrom units thick, of nickel-iron alloy, formed by a photo-etch process subsequent to the vacuum deposition of the film upon a glass substrate. $H_c$, the coercivity of the magnetic material comprising the film element, was approximately 2.1 oersteds; $H_k$, the anisotropy field, 2.6 oersteds. The perpendicular drive conductors and the sense wire were etched on a printed circuit panel. For convenience the parallel drive and sense conductors were placed on one side of the panel and the transverse drive conductor on the other side. A printed circuit overlay containing the bias conductors encompassed the entire memory plane. The larger amplitude transverse drive field $H_{T1}$ was chosen to be about 5 oersteds (400 ma.); the smaller amplitude transverse field $H_{T2}$, about 1.5 oersteds (120 ma.); the transverse bias field $H_{bias}$, approximately 1.3 oersteds (100 ma.); the parallel drive field $H_L$, 0.9 oersteds (100 ma.). The currents in the various conductors are dependent upon the parameters of the magnetic material of which the storage element is composed, and their amplitude will also depend upon the width of the conductors and the spacing between themselves and the element. It should be emphasized that the foregoing dimensions and amplitudes given for the embodiment described, may vary according to the material, design or application, and are included solely for purposes of example.

Figure 2:
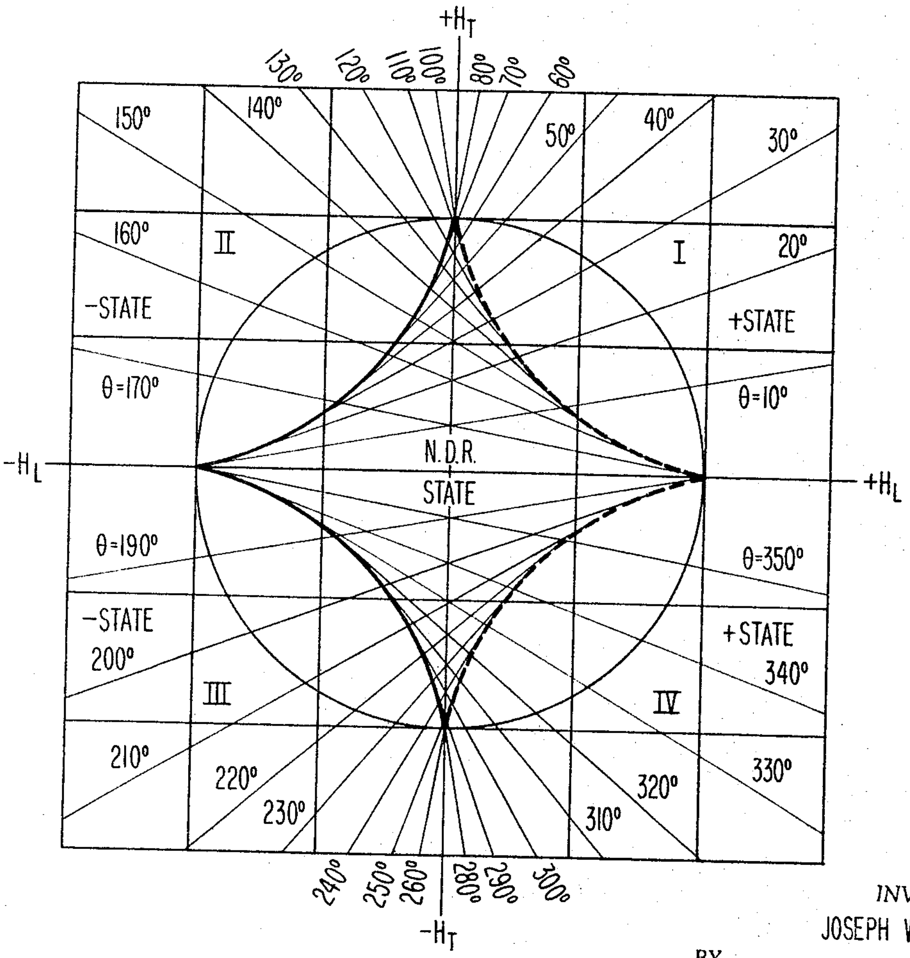
FIG. 2 is a reproduction of the Stoner-Wolfarth switching curve for thin magnetic films.

The switching curve for thin films, depicted in FIG. 2, was proposed by E. C. Stoner and E. P. Wolfarth in a paper entitled "Mechanism of Magnetic Hysteresis in Heterogenous Alloys," published in the Phil. Trans. Roy. Soc. (London), vol. 240, pp. 599–642 (1948). This switching curve provides a geometrical model suitable for evaluating the parameters associated with thin films. This model shows the geometric relationship between the magnitude and direction of an external field ($H_a$ and angle $\phi$) and the corresponding position of M (angle $\theta$). The cuve is plotted from a set of parametric equations that were derived from Equation 1, the energy equation. These equations are:

$$H_L=-H_k\cos^3\theta$$
$$H_T=H_k\sin^3\theta$$

In this model, $H_a$ is represented as a vector directed out from the origin. Its rectangular coordinates are the components $H_L$ and $H_T$. $H_a$ as it pertains to this plot is defined as the resultant vector sum of all the influences upon a magnetic dipole or domain in the film. This curve has the shape of an asteroid and is called the threshold switching curve. It represents the boundary conditions for which the state M will reverse. Actually, this curve should be thought of as being two different switching boundaries superimposed on each other.

In FIGS. 3*a* and 3*b* the two switching curves are drawn separately to illustrate the boundaries of each remanent state. As depicted in FIG. 3*a*, M is in the (+) state and $\theta$=zero degrees. M will remain in the (+) state as long as the point of $H_a$ is maintained to the right of the switching threshold. The position of M corresponding to a given $H_a$ is determined by drawing a line from the point of $H_a$ tangent to the switching threshold. The angle subtended by this line and the anisotropy axis is $\theta$. If $H_a$ is applied to the left of this switching threshold then M switches to the (−) state, at which time the switching threshold disappears and is replaced by the switching threshold illustrated in FIG. 3*b*. This switching threshold becomes the boundary of M in the (−) state. The position of M is again determined by drawing a line from the point of $H_a$ tangent to the switching curve. Again $\theta$ is the angle subtended by this line and the anisotropy axis. Any subsequent application of $H_a$, if they are maintained to the left of the switching threshold, cause M to remain in the (−) state.

When no field is applied M lies along the axis of anisotropy in either (+) or (−) states. If $H_T$ is applied at an amplitude less than $H_k$, and is then removed, M rotates but returns to its initial state. If $H_T$ is applied at an amplitude greater than $H_k$, the point of $H_T$ lies on the switching threshold common to both states. Removal of this latter field results in M rotating in an uncertain direction. However, if prior to removing the $H_T$ field, an $H_L$ field is applied in coincidence with $H_T$, then the resultant field $H_a$ will lie to one side of the switching threshold. In this manner the polarity of $H_L$ determines the state M will acquire when $H_L$ is removed. The latter technique may be used for writing a desired state in a memory application, and is described and claimed in the aforementioned copending Bittmann application. It should be noted that frequently the domain arrangement in a thin film element is a multiple domain. The individual magnetic moments however, each behave according to the Stoner-Wolfarth model.

While the switching curve of FIG. 2 represents an ideal situation, it nevertheless can be modified to adequately illustrate various thin film parameters. Among those parameters of primary importance to memory design which can be illustrated by this model are the static parameters of magnitude dispersion of $H_k$ (sometimes referred to as $\Delta H_k$) angular dispersion of the anisotropic axis ($\beta$) and skew ($\alpha$). The model will also be used to illustrate a dynamic parameter which enables the practice of the present invention, namely anisotropic axis rotation.

It has been observed that when a transverse field such as $+H_T$ is applied to a thin film sample, the axis of anisotropy rotates, through a small angle toward the direction of the field. The amount of rotation appears to be a function of the amplitude and duration of the $+H_T$. This behavior implies that if M lies in the (+) state, then the anisotropy direction rotates through a (+) angle $\gamma$; if M lies in the (−) state then the anisotropy direction rotates through a (−) angle $\gamma$. This is true for rotation of M in the first and second quadrants. The directions of the angles are reversed for rotation of M in the third and fourth quadrants.

FIG. 4 depicts the rotation of the switching curve due to the application of a transverse bias field. Reference to this switching curve has revealed that regions of hysteresis exist, that the nondestructive read-out region of the curve has been expanded and that a new region called the region of domain reversal has been formed. In FIG. 4 the axis of anisotropy is shown rotated by an angle $\gamma$ of approximately 5 degrees due to the application of a constant bias field designated $H_{bias}$. A more comprehensive illustration might include a family of curves, each for a different value of $H_{bias}$, with successive curves rotated through a larger angle $\gamma$, as $H_{bias}$ is increased. It has been observed that the application of a given $H_{bias}$ causes the angle $\gamma$ to increase according to an exponential time constant. When the film sample is in the (+) state, the solid curve represents the switching threshold. A tangent to this curve drawn through the point of $H_{bias}$ denotes the angle $\theta$, that is, the angle which M makes with the axis of anisotropy. If an external field $H_a$ is added to $H_{bias}$, so that the point of the applied field is to the right of and below the solid line, M will remain in the (+) state. If the point of $H_a$ should lie to the left of the solid line, then M will switch to an angle $\theta$, denoted by a line drawn from that point tangent to the dashed line. When $H_a$ is removed, M will rotate, leaving the film sample in the (−) state.

For purpose of explanation, it is assumed that the film sample is in the (+) state, and that the field $H_a$ is applied so that the point of $H_a$ falls in the Y-shaped region bounded by the two solid lines. Within this region domain reversals occur, that is, a region in the center of the film switches to the negative state upon removal of $H_a$. The two solid lines are switching boundaries—the line on the right representing the boundary of smallest domain reversal, and the line on the left the boundary of complete switching. Throughout the region bounded by the two lines, the domain width is continuously variable. It has been noted that after a domain reversal has occurred, and if the subsequent application of $H_a$ is maintained within the region bounded by both the dashed and solid lines, the domain arrangement is irreversible, that is, it remains unchanged. Rotation of M within the domains is independent of the location and movement of domain walls, and observations have indicated that the walls remain fixed.

The dashed line of the switching curve of FIG. 4 applies to a film sample in the (−) state. The switching behavior of this state is converse to the (+) state. For the case of a film sample containing a multiple domain arrangement, the curve is applicable to each domain. If the point of $H_a$ is maintained within the NDR region bounded by the dashed and solid lines, then the domain arrangement is stable and no reversal or wall movement will occur. The reduction of $H_{bias}$ to zero causes the angle $\gamma$ to decrease, but not to zero reflecting a hysteresis condition. This hysteresis angle has been found to be 1 or 2 degrees. Although in a representative embodiment of the present invention a constant transverse bias field is applied, it is also possible because of the aforementioned hysteresis, to apply a transverse bias field to rotate the axis of anisotropy prior to the operation of the memory and then to remove this field. The axis will then rotate toward its original position, but due to the hysteresis the new position will differ from the original by a small angle. Under these conditions the switching curve for the film element would likewise resemble that of FIG. 4.

If a $-H_{bias}$ is applied to the thin film element in the $-H_T$ direction a curve that is the mirror image of that shown in FIG. 4 will result. This curve would be displayed in quadrants III and IV.

The improvement in the nondestructive read-out mode realized in the present invention stems from the use of a transverse bias field and the resulting rotation of the axis of anisotropy. As is evident from a comparison of the switching curve of FIG. 4 with the Stoner-Wolfarth curve of FIG. 2, the nondestructive read-out region (NDR) in FIG. 4 has been widened and extended above the circle of $H_k$. In a practical working embodiment and as a result of the bias, the moment M rotates to an angle $(\theta+\gamma)$ of approximately 35 degrees if the element is in the (+) state, or $(\theta-\gamma)$ 145 degrees, if the elementis in the (−) state. It will be assumed that a sense conductor such as conductor 28 of FIG. 1 is used to sense changes in flux along the easy axis during interrogation. Thus conductor 28 has its magnetic axis lying parallel to the initial average axis of anisotropy, which latter axis may be thought of as lying parallel to the 0°–180° line of the curve of FIG. 4. The voltage induced in the sense conductor is related tc the amount of flux which is rotated, which in turn is a function of the change in the cosine of angle $(\theta+\gamma)$ or $(\theta-\gamma)$, the angle which M makes with the magnetic axis of the sense conductor. Because of the cosine relationship, the flux change caused by the rotation of M to about 35 degrees by the bias field is small compared with the flux change for rotation from 35 degrees to approximately 80 degrees caused by the transverse drive field $H_{T2}$ superimposed on the bias field. Thus in contrast to the small read-out signals often associated with NDR techniques, a substantial read-out signal is induced in the sense conductor. Another important consideration should not be overlooked. It is only because of the expanded NDR region and its extension above the $H_k$ circle, that it is possible to apply fields to drive M to such a large angle, for example 85 degrees, without danger of domain reversals occurring. The well known switching curve of FIG. 2 with its sharply peaked configuration allows for reliable operation to only about 40 degrees before partial switching may be encountered. As indicated the amount of flux rotated and the amplitude of the induced output signal is minimal under these conditions. When driving to larger angles in the vicinity of the peaked region of FIG. 2, small longitudinal fields such as those encountered in normal memory operation from the influence of adjacent bits, conductors, or external sources may cause the total applied field to lie outside the switching curve thereby causing a disturbance of the original domain pattern. The reliability is further decreased by the usual and somewhat unpredictable angular dispersion of the anisotropy axis and the magnitude dispersion of $H_k$. The rotated switching curve of FIG. 4, as taught by the present invention, greatly reduces the detrimental effects of these conditions.

Various methods may be employed to provide the $H_{bias}$ field utilized in the present invention. These methods include applying a bias current to the usual transverse drive conductor such as 24 in FIG. 1 which encompasses the film spot, or by means of a printed circuits overlay containing a coil including conductor 25 which would encompass each memory plane, or by the use of permanent magnets or Helmholtz coils.

Before describing the representative storage system depicted in FIG. 6, the pulse diagram of FIG. 5 which illustrates the mode of writing information into an element and reading it out nondestructively will be considered. In this connection reference should also be made to FIG. 1 which depicts a film element and its associated conductors.

It will be assumed that it is desired to cause element 22 of FIG. 1 to be magnetized in the (+) state, which will arbitrarily represent the storage of a binary "1." Further it is assumed that element 22 is demagnetized, with domains alternately residing in the (+) state and (−) state.

At time $t_0$ a relatively weak transverse bias field, $H_{bias}$, is applied to element 25 by means of current flow through conductor 25. This bias remains constant and is applied to the element throughout the period of operation. If a strong transverse drive field $H_{T1}$ is applied in the same direction as the bias field to element 22 at time $t_1$ by means of current flow through conductor 24, a wide region of magnetic dipoles are rotated toward 90 degrees. At time $t_1$, a comparatively weak longitudinal field, $+H_L$, is applied to element 22 because of current flow through conductor 26. At time $t_2$, $H_{T1}$ terminates and substantially all of the magnetic dipoles acting as a single large domain rotate to the (+) state. Thus the storage or writing of a binary "1" into element 22 has been accomplished approximately between times $t_1$ and $t_2$. The flux changes created by the rotation of the magnetic dipoles when the fields are applied or removed result in sense signals being induced in a sense conductor, such as conductor 28 of FIG. 1. These sense signals are illustrated in FIG. 5.

Successive read-outs or interrogations of the magnetic element are illustrated as occurring during the period $t_3$–$t_6$, and are accomplished by the application of successive $H_{T2}$ fields. Each time $H_{T2}$ is applied to the element, for example at times $t_3$ and $t_5$, the magnetic dipoles of element 22 will rotate and a voltage will be induced in sense conductor 28. Moreover, $H_{T2}$ may be repeated indefinitely without any degradation of the output signal amplitude. Erratic changes or jumps in the output signal amplitude and various non-uniformities of the signal usually apparent over a large number of interrogations in other nondestructive read-out methods, are virtually eliminated by the rotation of the direction of anisotropy as taught in the present invention.

The magnitude of $H_{T2}$ is selected so that it falls within the expanded (NDR) region illustrated in FIG. 4. When $H_{T2}$ is removed, such as at times $t_4$ and $t_6$, the magnetic dipoles fall back to the original (+) state. The appearance of a positive pulse followed by a negative pulse on the sense wire can be interpretated as a read-out of a binary 1. In some applications the positive pulse only would be useful to the utilization device, while the negative pulse would be extraneous and perhaps troublesome. In these applications suitable gating means, a variety of which are well known in the electronics art, can be used to gate out the negative pulses.

Approximately, between the times $t_7$ and $t_8$, the binary "1" stored in the element is read out destructively, and a binary "0" is written into the element. This is accomplished by applying a storng transverse field $H_{T1}$ at time $t_7$, and a weaker longitudinal field $-H_L$ at time $t_{7'}$. $H_{T1}$ rotates the magnetic dipoles in a transverse direction and the $-H_L$ field exerts a force on these dipoles which causes substantially all of the dipoles to rotate to the (−) state upon the termination of the $H_{T1}$ pulse at $t_8$ time.

As in the case of interrogation when the element was in the (+) state, repeated $H_{T2}$ puses will cause a useful output signal to be generated in sense line 28, without destroying the stored binary "0." The occurrence of a negative pulse followed by a positive one, as observed on the sense wire, can be interpreted as a read-out of a binary "0." If the positive pulse is objectionable it may be gated out in a manner well known to those skilled in the electronics art.

FIG. 6 depicts twelve film elements with conductor assemblies similar to the one assembly shown in FIG. 1, and auxiliary equipment connected to illustrate the use of the present invention as a data store. Only the elements in the first word have been numbered respectively 221, 222 and 223, since a consideration of these elements will suffice in the explanation of the operation of the memory array of FIG. 6. Likewise only the transverse drive conductor for "word 1" has been designated by a reference numeral, namely 241. The parallel drive conductors associated with the "information drivers" for bits 1, 2 and 3 are designated respectively 261, 262 and 263; the sense conductors for each of the bits are designated 281 for "bit 1," 282 for "bit 2" and 283 for "bit 3." As the reader has probably noted, the first two numbers of each of the items, both magnetic elements and conductors in FIG. 10, have been chosen to correspond with like items in FIG. 1, the third number being indicative of their position in the array. The preferred direction of each of the elements in the array is vertical and lies within the plane of the paper.

The transverse bias conductors 250 are depicted as an overlay encompassing the entire memory plane. The parallel drive and sense conductors, 261, 281, respectively, and the bias conductors 250 are shown as returning to their sources by traversing the underside of the base or substrate 201. It should be understood that, although not shown in such detail, all of the other conductors are assumed to return in like manner.

Each pair of sense conductors is connected to a transformer, or differential amplifier, in order to reject common-mode noise signals. Thus sense wires 281, 282 and 283 are connected respectively to the primary windings of transformers 601, 602 and 603. The secondaries of the transformers are each connected respectively to sense amplifiers, 701, 702 and 703.

In electrical computing and data processing apparatus, it is conventional to achieve economy of apparatus by causing the same physical assemblies to perform functions as part of different logical entities at different times. For simplicity of explanation, rectangles or blocks are employed to represent assemblies of apparatus to perform specified electrical or logical operations. Various conventional methods and apparatus for performing these functions are well known to those skilled in the electronics art, particularly the electronic computer field.

Block 300 represents a source of control signals, which are applied selectively by channels represented as single lines, although they may be multiple conductors in some or all of the cases, by way of line 301 to a source of read-write instructions 400 and by way of line 302 to a source of write instruction 303. The control signal source 300 will perform its directive or function in accordance with the logical requirements of the over-all operation to be performed by the computing or analogous system which is to employ the present invention as a memory. The functions of the control signal source 300 will be specified only insofar as they relate to the practice of the present invention.

Assume that it is desired to record or write information into the memory and that such information has been stored in the memory register 500. The register 500 serves as a buffer between the input of information into the memory and output of information from the memory. As depicted in FIG. 6, the memory register 500 is shown as comprising three stages, i.e., it is capable of storing at any one time three bits of data. Information may enter the register from somewhere in the computer logic circuits or from a source external to the computer by way of lines 501, 502 and 503. Similarly, the information stored in the register at any time is available for use in such logic circuits or by an external utilization device by way of lines 901, 902 and 903.

It will be further assumed that the information to be written into the memory is the binary number "101," and that it is to be written into the memory as "word 1." The control signal source 300 applies by way of line 301 two command pulses to the read-write instructions block 400 in order to implement the write cycle, together with a third pulse representative of the address instruction. The transverse driver selection matrix 600 which, depending upon the particular application, may include either a diode, transformer or transistor matrix which are well known in the computer field, senses the address which is stored in the read-write instructions block 400. Selection of a desired word may be had by coincidence of a driver and a switch. The switch will clamp one terminal of the selection matrix to a predetermined supply potential and the circuit is completed when the proper driver is enabled.

In the present example, the selection matrix 600 selects the driver and switch associated with "word 1" in order that the bits of information stored in the memory register 500 can be written respectively into the three storage elements 221, 222 and 223.

Reference to FIG. 5 will indicate the timing sequence for the application of fields to the storage elements for writing and reading a binary "1" and a binary "0."

With reference to the pulse diagram of FIG. 5, initially at time $t_0$, the transverse bias driver 200 is actuated, current flows through conductors 250, and a transverse field is applied to all of the elements on the plane. Sufficient time must be provided between the application of the bias field and the operation of the memory to allow the rotation of the anisotropy axis to reach a quiescent position. For convenience, the bias may be maintained throughout the memory operation. Alternatively, allowing sufficient time as indicated previously, the bias may be applied only during the interrogation or read-out portion of the memory cycle. At time $t_1$, the driver selection matrix 600 senses the first half of the write instruction from the instructions block 400 and causes a high level transverse drive current to flow through conductor 241, thereby generating the $H_{T1}$ field which is applied to the magnetic elements. At a later time $t_{1'}$, the control source 300 pulses the write instruction block 303 by way of line 302. Each of the information drivers 101, 102 and 103 constantly sense the information in their respective bit positions in the memory register 500 by means of lines 401, 402 and 403. The reception of a pulse by the write instruction block 303 from the control signal source 300, directs by way of a signal on line 304 all of the drivers to write simultaneously. If the particular driver senses a "1" in the memory register to be written into the memory, this driver will supply a positive pulse at time $t_{1'}$, for generating the $+H_L$ field, as shown at $t_{1'}$ in FIG. 5. On the other hand, if a driver senses a "0" it will supply a negative pulse for $-H_L$ at $t_{1'}$, as shown at $t_{7'}$, in FIG. 5.

In the present example, the information driver 101 for bit 1 will apply a positive pulse of current, to generate $+H_L$, to the longitudinal drive conductor 261, at time $t_{1'}$; driver 102 will apply a negative pulse, for $-H_L$, to conductor 262; driver 103, a positive pulse to conductor 263.

At time $t_2$ the transverse driver selection matrix 600 terminates the high level transverse current, and shortly afterward the information driver pulses terminate. The writing cycle is now complete — "word 1" of the memory now stores a "1" as bit 1, "O" for bit 2, and "1" for bit 3.

To read the information out of the memory at time $t_3$, the control source 300 sends two commands to the read-write instructions block 400, one for the address, the other to read. Assuming that the address is still for "word 1," the transverse driver selection matrix 600 senses the instructions stores in block 400, and causes low level current to flow through drive conductor 241, in order to produce the $H_{T2}$ field, and the information in magnetic elements 221, 222 and 223 is read out nondestructively as hereinbefore described in connection with FIG. 5.

As a result of the reading operation, a positive pulse followed by a negative one will appear on each of sense lines 281 and 283, as depicted at times $t_3$ and $t_4$ of FIG. 5, and a negative pulse followed by a positive pulse, as shown at times $t_9$ and $t_{10}$ in FIG. 5, will appear on sense wire 282. The signals on sense lines 281, 282 and 283 are coupled respectively by transformers 601, 602 and 603 into sense amplifiers 701, 702 and 703. It is assumed that the sense amplifiers contain suitable gating circuits to gate out the undesired polarity signals induced in the sense wires. The outputs of the sense amplifiers are fed in parallel to the appropriate locations in the memory register 500 by way of lines 801, 802 and 803, where the information is stored and may be utilized by either the computer logic circuits or an external utilization device.

Information may now be written into "word 2" and "word 3" of the memory by presenting the desired information in the memory register and initiating the write instructions as hereinbefore described. New information may also be written into "word 1" in the same manner, in which case the information stored by the previous write cycle is destroyed by the new write cycle. As new information is stored in the memory register 500 by either the computer logic circuits or the sense amplifiers, the information previously stored therein is destroyed and only the new information remains.

Since components of magnetizing fields may be added to produce a resultant different from either component in direction and magnitude, it is obvious in the light of the art that combinations of current-carrying conductors, or other sources of magnetizing fields, different from those here employed to teach the basic principles of nondestructively reading the content of very fast magnetic data stores, may be applied. Modifications of the arrangements described herein may be required to fit particular operating requirements. These will be apparent to those skilled in the art. The invention is not considered limited to the embodiments chosen for purposes of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A data store comprising at least one bistable magnetic storage element capable of attaining opposed states of residual flux density along an average axis of anisotropy, means for magnetizing said element substantially in a predetermined one of said states, means for providing a bias magnetizing field substantially transverse to the initial direction of said axis of anisotropy, said bias magnetizing field causing said axis of anisotropy to rotate from its initial direction toward the direction of said bias field, means for applying an interrogation magnetizing field to said element in substantially the same direction as said bias field, said interrogation magnetizing field being applied to said element after the application of said bias field and while said bias field is present, said interrogation field causing a rotation of the magnetization of said element toward a direction transverse to the initial direction of said axis of anisotropy, the combined amplitudes of said bias and interrogation fields being such that said element is not switched from said predetermined state to its opposite state, the rotation of said axis of anisotropy by said bias field serving to expand and extend the non-switching region of the switching curve for said storage element whereby the degree of rotation of the magnetization of said element effected without domain reversal by said interrogation field is considerably greater than if the axis of anisotropy had not been rotated by said bias field.

2. A data store as defined in claim 1, wherein said bistable storage element is a thin film of ferromagnetic alloy.

3. A data store comprising at least one ferromagnetic storage element capable of attaining opposed stable states of residual flux density along a preferred axis of magnetization, first means for applying magnetizing fields to said element to cause substantially all of the magnetic dipoles of said element to assume a predetermined one of said states, second means for applying continuously to said element a bias magnetizing field substantially transverse to said preferred axis, said bias field rotating said preferred axis from its initial position toward the direction of said bias field to a second position and concurrently rotating the magnetic dipoles of said element from said predetermined state to a magnetically unstable state, third means for applying to said element a read-out magnetizing field in substantially the same direction as said bias field, said read-out field causing an additional rotation of the magnetic dipoles in the same direction as the rotation caused by said bias field, the combined magnitudes of said bias and read-out fields being insufficient to cause said element to switch from said predetermined state to its opposite state, and means for sensing the rotation of said magnetic dipoles in response to the application of said read-out field, whereby a substantial output signal is realized without altering the predetermined state of said element.

4. A data store comprising at least one ferromagnetic storage element capable of assuming opposed stable states of residual flux density along a preferred axis of magnetization, means for applying a constant bias magnetizing field to said element in a direction substantially transverse to said preferred axis, said bias field causing the rotation of said preferred axis from its initial position toward the direction of the bias field to a second position, means for applying in overlapping relationship to said magnetic element a first magnetizing field orthogonal to said bias field and a second magnetizing field parallel to said bias field to cause substantially all of the magnetic dipoles to rotate toward a predetermined one of said states, said bias field effecting a displacement of the orientation of said magnetic dipoles from said predetermined state to a magnetically unstable state, means for applying to said element a read-out magnetizing field parallel to said bias field for causing an additional rotation of said magnetic dipoles in the same direction as the rotation caused by said bias field, the combined amplitudes of said bias and read-out fields being insufficient to cause said element to switch from said predetermined state to its opposite state, the rotation of said axis of anisotropy by said bias field serving to expand and extend the non-switching region of the switching curve for said storage element whereby the degree of rotation of the magnetization of said element effected without domain reversal by said read-out field is considerably greater than if the preferred axis had not been rotated by said bias field.

5. A data store as defined in claim 4, wherein said ferromagnetic storage element is a thin film of ferromagnetic alloy having a thickness of not more than 5000 angstrom units.

6. A data store as defined in claim 4 including means for sensing the rotation of said magnetic dipoles of said element in response to the application of said read-out field.

7. A data store as defined in claim 4 wherein said means for applying a bias field, said first and second magnetizing fields and said read-out field, each includes an electrical conductor adjacent to but not geometrically linked with said ferromagnetic storage element, and means operatively connected to said electrical conductors for selectively driving current therethrough.

8. A data store as defined in claim 7 wherein said means for sensing the rotation of said magnetic dipoles during read-out comprises an electrical conductor adjacent to but not geometrically linked with said ferromagnetic storage element and having its magnetic axis oriented substantially parallel to the initial position of said preferred axis.

9. A data store comprising at least one ferromagnetic storage element capable of assuming opposed states of residual flux density along a preferred axis of magnetization, means for conditioning said element for operation in a nondestructive read-out mode by applying thereto a short duration bias magnetizing field substantially transverse to said preferred axis of said element, said preferred axis rotating from its initial direction toward the direction of said bias field to a second direction in response to the application of said bias field and upon the termination of said bias field, rotating toward but not returning to said initial direction, means for magnetizing said element in a predetermined one of said states by applying thereto a pair of overlapping magnetizing fields in directions respectively parallel and transverse to the direction of said bias field, means for applying an interrogation magnetizing field to said element in a direction substantially transverse to the initial direction of said preferred axis and in the same direction as said bias field, whereby the magnetization of said element is rotated toward the direction of said interrogation field, said interrogation field being of insufficient amplitude to cause said element to switch from said predetermined state to its opposite state, the rotation of said preferred axis in response to said short-duration bias field serving to increase the degree of the rotation of magnetization of said element which may be effected by said interrogation field without causing partial switching of the element, and means for sensing the rotation of the magnetization of said element by said interrogation field.

10. A data store comprising, a storage element in the form of a magnetically bistable thin film disposed in a single plane and having a preferred axis of magnetization substantially the same everywhere in the element and substantially parallel to the plane thereof, bias conductor means adjacent to said element and extending in a parallel plane thereacross and being positioned parallel to the initial direction of said preferred axis, transverse drive conductor means adjacent to said element and extending in a parallel plane thereacross and being positioned parallel to the initial direction of said preferred axis, longitudinal drive conductor means adjacent to said element and extending in a parallel plane thereacross and being positioned orthogonal to the initial direction of said preferred axis, means for causing a constant duration current to flow through said bias conductor means so as to produce a bias field, said bias field causing the rotation of said preferred axis from its initial direction toward the direction of the bias field to a second direction, means for causing current to flow through said transverse drive conductor means to produce a magnetizing field parallel to said bias field, means for causing current to flow through said longitudinal drive conductor means so as to produce a magnetizing field orthogonal to said bias field, said magnetizing fields appearing respectively in a direction parallel and transverse to said bias field being applied in overlapping relationship to said storage element and being operable to rotate the direction of magnetization of substantially the entirety of said magnetizing element toward a predetermined stable state, said bias field causing a rotation of the magnetization of said element toward said bias field to a direction displaced from said second direction of said preferred axis, means for causing current to flow through said transverse drive conductor means for producing an interrogation magnetizing field parallel to said bias field, said interrogation field causing an additional rotation of the magnetization of said element in the same direction as the rotation caused by said bias field, the combined amplitudes of said bias and interrogation magnetizing fields being insufficient to cause said element to switch from said predetermined state to its opposite state, the rotation of said preferred axis by said bias field serving to increase the degree of rotation of the magnetization of said element which may be effected without domain reversal by said interrogation field as compared to the degree of rotation permissible if the axis of anisotropy has not been rotated by said bias field.

11. A data store as defined in claim 10 including means for sensing the rotation of the magnetization of said element in response to the application of said interrogation field.

12. A data store as defined in claim 11 wherein said means for sensing said rotation of the magnetization during interrogation comprises a sense conductor adjacent to said magnetic element and extending in a parallel plane thereacross and being positioned orthogonal to the initial direction of said preferred axis.

13. A data store comprising a plurality of thin ferromagnetic storage elements arranged in rows and columns, said elements being capable of attaining opposed states of residual flux density along a preferred axis of magnetization, a column-driving conductor for each column inductively coupled to all of the storage elements in a column and substantially aligned with the initial direction of said preferred axis of magnetization, a row-driving conductor for each row inductively coupled to all of the storage elements in a row and substantially oriented at right angles to the initial direction of said preferred axis of magnetization, a bias conductor inductively coupled to all of said plurality of storage elements and substantially aligned with the initial direction of said preferred axis of magnetization of each of said elements, means for causing a constant duration current to flow through said bias conductor so as to apply a bias field to each of said plurality of storage elements, said bias field causing the rotation of said preferred axis from its initial direction toward the direction of the bias field to a second direction, means for applying driving currents in overlapping relationship to the column conductor of a selected column so as to apply a first magnetizing field transverse to the initial direction of said preferred axis to all of the storage elements in said selected column, and to each row conductor for applying a second magnetizing field parallel to the initial direction of said preferred axis and of preselected polarity to all of the elements coupled thereto, the direction of magnetization of substantially the entirety of each of the storage elements in said selected column being rotated to a predetermined state as a function of the polarity of said second magnetizing field, said bias field causing a rotation of the magnetization of said element toward said bias field to a direction displaced from said second direction of said preferred axis, means including said column conductor of said selected column for applying an interrogation magnetizing field parallel to and in the same direction as said bias field to each of the storage elements of said selected column, said interrogation field causing an additional rotation of the magnetization of each of the last-mentioned storage elements in the same direction as the rotation caused by said bias field, the combined amplitudes of said bias and interrogation magnetizing fields being insufficient to cause said last-mentioned storage elements to switch from their respective predetermined states to the opposite states, the rotation of said preferred axis by said bias field serving to increase the degree of rotation of the magnetization of said last-mentioned storage elements which may be effected without domain reversal by said interrogation field as compared to the degree of rotation permissible if the axis of anisotropy has not been rotated by said bias field.

14. A data store as defined in claim 13 further including a plurality of sense conductors inductively coupled to respective rows of said storage elements and substantially oriented at right angles to the initial direction of the preferred axis of magnetization of each of said elements, the rotation of the magnetization of the storage elements in said selected column in response to said interrogation field causing sense signals to be induced in the sense conductors coupled respectively to said last-mentioned elements.

References Cited by the Examiner

UNITED STATES PATENTS

| | | | |
|---|---|---|---|
| 3,054,094 | 9/1962 | Stuckert | 340—174 |
| 3,070,783 | 12/1962 | Pohm | 340—174 |
| 3,151,315 | 9/1964 | Dunham | 340—174 |

OTHER REFERENCES

IBM Technical Disclosure Bulletin, H. J. Oguey, "Magnetic Film Memory," vol. 4, No. 4, September 1961, pages 42 and 43.

BERNARD KONICK, *Primary Examiner.*

M. S. GITTES, *Assistant Examiner.*